United States Patent
Schmeisser et al.

(10) Patent No.: US 6,693,367 B1
(45) Date of Patent: Feb. 17, 2004

(54) SINGLE-HAND HELD DIAGNOSTIC DISPLAY UNIT

(75) Inventors: Gordon F. Schmeisser, Santa Cruz, CA (US); James M. Normile, Hayward, CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/698,152

(22) Filed: Oct. 30, 2000

Related U.S. Application Data

(60) Provisional application No. 60/199,364, filed on Apr. 25, 2000.

(51) Int. Cl.⁷ .................................................. B60L 1/00
(52) U.S. Cl. ......................... 307/9.1; 701/29; 361/683
(58) Field of Search .................... 307/9.1, 10.1; 701/29; 361/680, 681, 683

(56) References Cited

U.S. PATENT DOCUMENTS

| | | | |
|---|---|---|---|
| 4,113,980 A | | 9/1978 | Bell |
| 4,969,647 A | * | 11/1990 | Mical et al. .................. 126/54 |
| 5,030,129 A | | 7/1991 | Koch |
| D345,164 S | * | 3/1994 | Grae .......................... D14/401 |
| 5,404,267 A | * | 4/1995 | Silva et al. .................... 16/430 |
| 5,515,303 A | * | 5/1996 | Cargin et al. ............... 235/375 |
| 5,541,840 A | | 7/1996 | Gurne et al. |
| 5,561,331 A | | 10/1996 | Suyama et al. |
| 5,661,634 A | * | 8/1997 | Obata et al. ................. 361/684 |
| 5,758,300 A | | 5/1998 | Abe |
| 5,825,675 A | * | 10/1998 | Want et al. .................. 708/142 |
| 5,835,342 A | * | 11/1998 | Hunte ......................... 248/918 |
| 5,875,413 A | | 2/1999 | Vinci |
| 5,884,202 A | * | 3/1999 | Arjomand .................... 340/439 |
| 5,893,483 A | * | 4/1999 | Duran ........................ 206/38.1 |
| 5,898,162 A | | 4/1999 | Koenck et al. |
| 5,916,286 A | | 6/1999 | Seashore et al. |
| 5,993,743 A | | 11/1999 | Nordman et al. |
| 6,064,564 A | * | 5/2000 | Song et al. .................. 361/680 |
| 6,144,976 A | * | 11/2000 | Silva et al. .................. 708/100 |
| 6,153,843 A | * | 11/2000 | Date et al. ................... 200/339 |
| 6,362,813 B1 | * | 3/2002 | Worn et al. .................. 345/1.2 |

FOREIGN PATENT DOCUMENTS

| | | |
|---|---|---|
| EP | 0 754 940 | 6/1996 |
| JP | 03001672 | 8/1991 |

* cited by examiner

Primary Examiner—Gregory J. Toatley, Jr.
Assistant Examiner—Sharon A. Polk
(74) Attorney, Agent, or Firm—McDermott, Will & Emery

(57) ABSTRACT

A vehicle diagnostic display unit is provided for performing diagnostic procedures on a vehicle using only one hand. The vehicle diagnostic display unit includes a case, a display screen, a main support, and a plurality of keys. The case has a front portion, a rear portion, a top portion, and a bottom portion. The display screen is disposed within the front portion, and the main support is coupled to a side of the case. The main support is configured such that a user can simultaneously lift and operate the diagnostic display unit with a single hand.

59 Claims, 5 Drawing Sheets

SINGLE-HAND HELD DIAGNOSTIC DISPLAY UNIT

RELATED APPLICATIONS

This application claims priority from U.S. Provisional Patent Application Ser. No. 60/199,364, filed Apr. 25, 2000, which is incorporated herein by reference.

BACKGROUND OF THE INVENTION

1. Technical Field

The present invention relates to vehicle, diagnostic systems and, more particularly, to a vehicle diagnostic display unit that can be held and operated using one hand.

2. Description of the Related Art

Modern vehicles include various electronic control units, such as microprocessors and controllers, that are programmed to control vehicle operations. Such control units include, for example, an Electronic Control Module (ECM) or on-board computer. The control units are designed to monitor the operation of various electronic components and electronics in order optimize vehicle performance. For example, control units such as an ECM can monitor the amount of carbon monoxide in the engine exhaust and adjust the fuel/air ratio entering the cylinders in order to optimize combustion efficiency. In other situations, the ECM can adjust the fuel/air ratio to improve either power output or fuel efficiency, depending on the type of driving condition.

The control units can be configured to monitor the performance and dynamics of the vehicle. For-example, many vehicles are equipped with advanced features such as Antilock Braking Systems (ABS), traction control, and stability control. In the case of ABS systems, the control units monitor wheel lock-up during braking, and automatically varies braking pressure to maximize braking ability while maintaining control. As another example, the control unit detects slippage of one or more wheels, and adjusts both throttle and braking to maximize. traction.

When multiple control units are available, they are typically interconnected so that certain key data is globally available. The data can be accessed by a user through an information port. Diagnostic systems are commonly used to obtain (and sometimes transmit) data through the information port. Accordingly, the diagnostic system can be used to monitor and adjust the operation of various systems of the vehicle. Diagnostic systems are also used to detect malfunctions that occur in systems such as engine management and ABS.

Diagnostic systems are generally in the form of large units that are coupled to the information port by means of a data cable. The diagnostic system typically includes a central processing unit, a display unit, and an input device such as a keyboard. All three units are interconnected and/or integrated into a single system. Because of the size of the diagnostic system, it is very difficult for a user (i.e., a service person) to quickly analyze information and effectuate changes to the vehicle's systems.

Specifically, the user is required to monitor information displayed by the diagnostic system and make adjustments to the vehicle's systems when appropriate. This is often a time consuming task because the user must physically travel between the diagnostic system and the vehicle to make the adjustments. Furthermore, once an adjustment has been made, the user must return to the diagnostic system. During extended diagnostic procedures, the user spends a great deal of time travelling between the diagnostic system and the vehicle to make adjustments to certain components.

Attempts at addressing these shortcomings have resulted in smaller diagnostic systems that are considered portable. Such portable systems can reduce the amount of travel by the user during diagnostic procedures. However, portable diagnostic systems are very bulky and heavy. The user is required to support the unit with both hands while working on the vehicle. Consequently, it becomes difficult for the user to simultaneously review the output of the diagnostic system while making adjustments to key vehicle components, because the diagnostic system must be placed in a secure location while the user works on the vehicle.

Accordingly, there exists a need for a vehicle diagnostic system that can be easily transported to the location of the vehicle during diagnostic procedures. There also exists a need for a vehicle diagnostic system that can be operated with only one hand, thereby freeing up one of the user's hand to work on the vehicle.

SUMMARY OF THE INVENTION

An advantage of the present invention is the ability to provide a diagnostic display unit that can be easily transported during diagnostic procedures. Another advantage of the present invention is a diagnostic display unit that can be operated using one hand, hence allowing a user to work on the vehicle using their free hand.

These and other advantages are provided by the present invention wherein a vehicle diagnostic display unit is configured for simultaneous holding and operation using a single hand.

According to one aspect of the present invention, a vehicle diagnostic display unit comprises a case, a display screen; main support, and a plurality of keys. The case includes a front portion, a rear portion, a top portion, and a bottom portion. The display screen is disposed within the front portion, while the main support is coupled to a side of the case. The main support contains a finger cavity or compartment in its rear surface, and the plurality of keys are disposed on its front surface. The main support is configured such that a user can simultaneously lift the diagnostic display unit and access keys with a single hand. Such a configuration advantageously allows the user to adjust key components in the vehicle while simultaneously monitoring the results of any adjustments and operating the diagnostic display unit.

According to another aspect of the present invention, the diagnostic display unit is provided with various adapters that include a plurality of connectors which allow coupling of the diagnostic display unit to the vehicle's onboard computer and external devices. For example, the diagnostic display unit can be provided with a Universal Serial Bus (USB), an RS-232 port, or an Ethernet port. The diagnostic display unit can also include various input and output connector for exchanging analog and digital data with the vehicle and/or external systems.

According to another aspect of the present invention, the diagnostic display unit includes at least one power supply compartment formed on the bottom portion of the case, and one or more power cells removably disposed within each power supply compartment. Such an arrangement advantageously improves the portability of the diagnostic display unit by eliminating the need for a separate power supply cable. Various other embodiments of the present invention provide for power cells that are in the form of either rechargeable or conventional batteries. When rechargeable batteries are used, the present invention can be configured to advantageously provide a charging circuit that draws power directly from the vehicle battery to recharge the rechargeable batteries of the diagnostic display unit.

Additional advantages and novel features of the present invention will be set forth in part in the description which follows, and in part will become apparent to those skilled in the art upon examination of the following, or may be learned by practice of the present invention. The embodiments shown and described provide an illustration of the best mode contemplated for carrying out the present invention. The invention is capable of modifications in various obvious respects, all without departing from the spirit and scope thereof. Accordingly, the drawings and description are to be regarded as illustrative in nature, and not as restrictive. The advantages of the present invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 1:
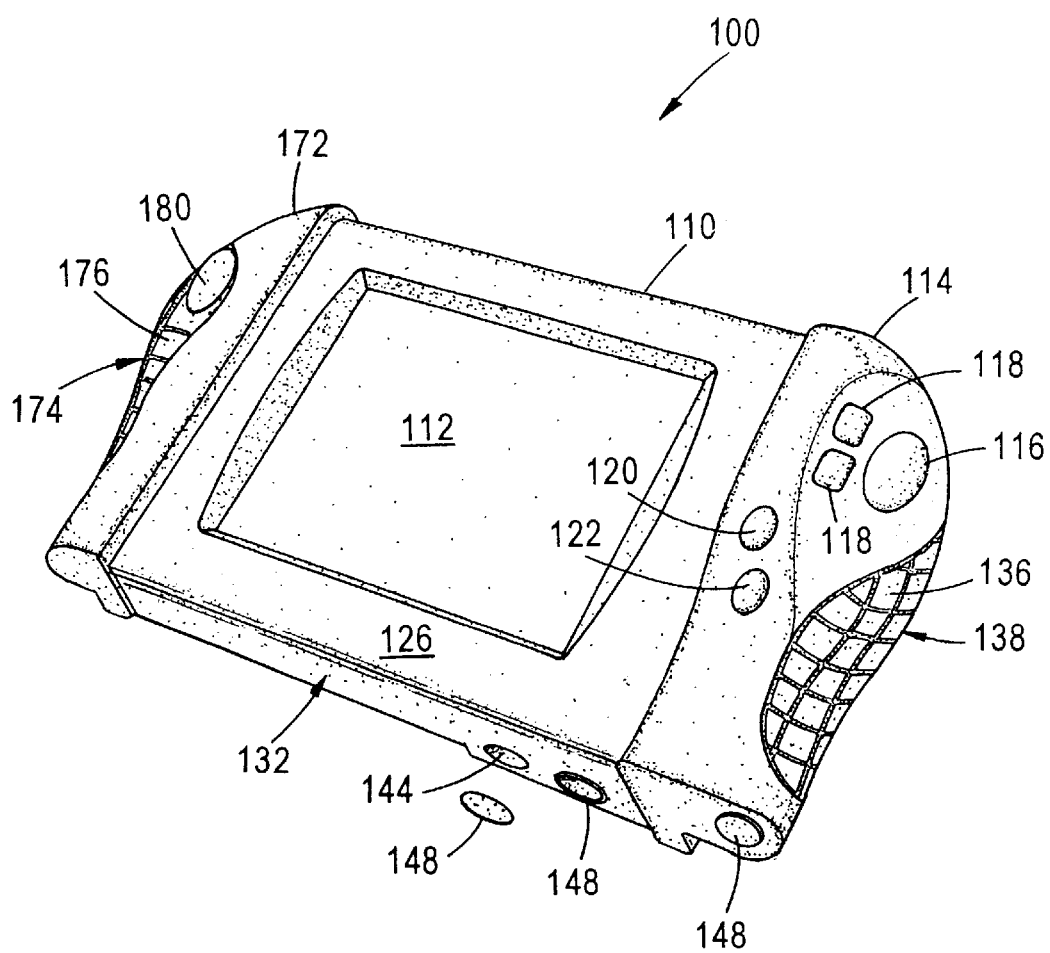
FIG. 1 is a perspective view of a vehicle diagnostic display unit constructed in accordance with an embodiment of the present invention.
Figure 2:
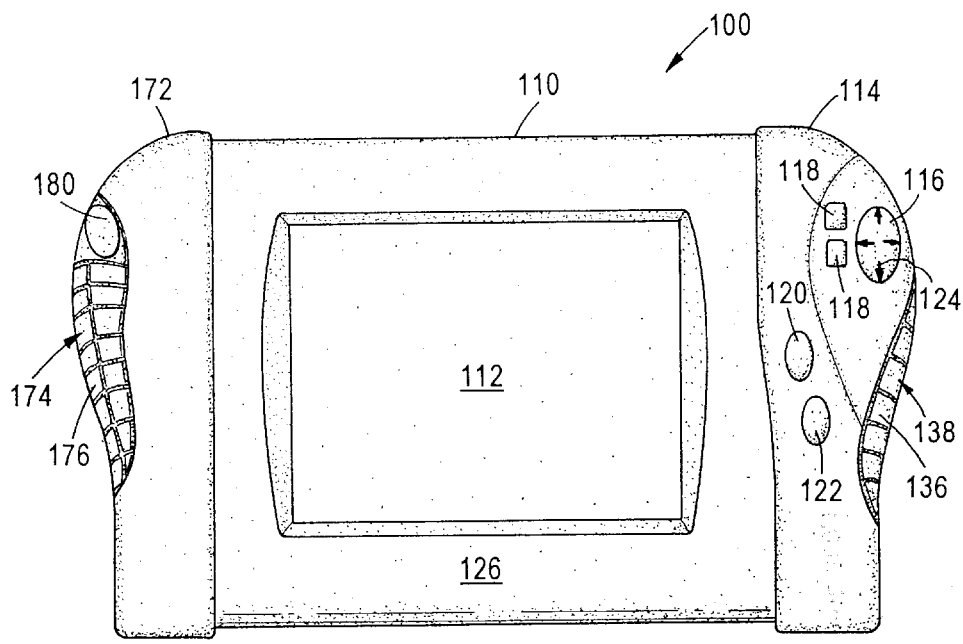
FIG. 2 is a front view of the vehicle diagnostic display unit.

Turning now the Drawings, and initially to FIGS. 1 and 2, there is shown a vehicle diagnostic display unit 100 constructed in accordance with the present invention. The diagnostic display unit 100 includes a case 110, a display screen 112, a main support 114, and a plurality of keys 116–122 disposed on the main support 114. The case 110 is in the form of a generally rectangular housing that includes a front portion 126, a rear portion 128 (best seen in FIG. 3), a top portion 130, (best seen in FIG. 7) and a bottom portion 132. The case 110 can be constructed from various materials, utilizing various construction and/or assembly processes. Preferably, the case 110 is constructed from ABS plastic using any of a variety of molding processes. Various portions of the case 110 can also be constructed from a thermoplastic elastomer (TPE). According to one aspect of the present invention, the case 110 is formed from two parts that are molded onto each other.

As illustrated in the Figures, the display screen 112 is mounted within the front portion 126 of the diagnostic display unit 100. The display screen 112 can be mounted in the front portion 126 of the diagnostic display unit 100 using various types of arrangements. In order to protect the display screen 112 and various circuitry within the diagnostic display unit 100 from damage resulting from potential impact, however, a shock mounting arrangement is preferably used to mount the display screen 112. As used herein, the shock mounting arrangement refers to an arrangement wherein shock absorption materials is interposed between the various layers of circuitry and/or components within the case 100. For example, shock absorption rubber or foam can be disposed between the display screen 112 and the case 110 in order to absorb any vibration or shock resulting from impacts such as dropping of the diagnostic display unit 100. According to such an arrangement, if a user accidentally drops the diagnostic display unit 100, the display screen 112 and associated circuitry will not be damaged. Preferably, the type of shock absorption material used in constructing the shock absorption arrangement is selected such that the diagnostic display unit 100 can withstand a fall from a height of at least five feet without suffering any damage. According to the disclosed embodiment of the invention, the display screen 112 is in the form of a liquid crystal display (LCD) screen. It should be noted, however, that various other types of display screens 112, such thin film transistor (TFT), touch sensitive, or gas plasma, can be used in place of the illustrated LCD display screen 112.

As is well known, such LCD display screens 112 typically incorporate a liquid crystal element positioned behind a glass and a back-lighting arrangement. As previously stated, however, various other types of displays can be substituted for the LCD display screen 112. Additionally, the display screen 112 can be constructed such that the projected display is either color, monochrome, or gray-scale. As illustrated in the Figures, the display screen 112 is mounted such that it is recessed within the front portion 126 of the case 110. According to such an arrangement, the display screen 112 is protected from direct impact even if the diagnostic display unit 100 is dropped on the front portion 126 thereof. Additionally, a layer of Lexan (not shown) approximately 0.10 inch in thickness can be disposed in front of the display screen 112.

The main support 114 is coupled to a side of the case 110 to allow a user to hold and operate the diagnostic display unit 100. Preferably, the main support 114 is ergonomically designed based on the shape and contour of the hand. Specifically, the main support 114 is contoured to comfortably fit within the palm of the user when holding the diagnostic display unit 100. The main support 114 is constructed from impact resistant or shock absorbing material. According to one embodiment of the present invention, the main support 114 is constructed from a Thermoplastic Elastomer (TPE). Furthermore, the TPE can be selected such that it has a hardness value of Shore A45 to A55. Preferably a Shore value of A50 is utilized.

As is well known, the Shore value represents the relative hardness and impact resistance of the material. A Shore value ranging from A45 to A55 insures that the main support 114 will provide adequate shock absorption while allowing a positive and secure grip within the hand of the user. The particular range of Shore values described herein is specifically selected to achieve maximum protection of the diagnostic display unit 100 while maintaining a stable construction.

For example, if the TPE material is too hard, there is less shock absorption available, and the display screen 112 as well as the internal circuitry will be prone to damage if the diagnostic display unit 100 is accidentally dropped. Additionally, it becomes difficult to obtain a secure grip around the main support 114. On the other hand, if the TPE material is too soft, it will become unstable over time. Consequently, the TPE (i.e., the main support 114) will tend to peel off. Additionally, various problems are encountered during the molding process if the TPE material is too soft. As illustrated in the Figures, the main support 114 includes a textured portion 136 having a plurality of intersecting grooves. The textured portion 136 functions to further improve the user's ability to comfortably and securely grip the main support 114.

According to the disclosed embodiment of the invention, a plurality of keys 116–122 are disposed on the front surface of the main support 114. The keys are used operate the diagnostic display unit 100. According to one embodiment of the present invention, the plurality of keys includes a navigation pad 116, a plurality of selection keys 118, a display adjustment key 120, and a power key 122. The navigation pad 116 is preferably in the form of directional thumb pad. In other words, by applying pressure along different portions of the navigation pad with the thumb, the user can navigate a cursor, not shown, on the display screen 112 through various menus. According to a preferred embodiment of the present invention, the navigation pad 116 is also pressure sensitive. According to such an embodiment the cursor can be moved at varying speeds based on the amount of pressure applied to the navigation pad 116. The navigation pad 116 can also be provided with directional arrows 124 imprinted on the surface thereof.

A pair of selection keys 118 is disposed adjacent to the navigation pad 116. The selection keys 118 allow an operator to make various selections within the menus displayed on the display screen 112. For example, the selection keys 118 can consist of a "yes" key and "no" key. In operation, the user would navigate the cursor to a particular item, or entry, and utilize the "yes" key to accept the entry or access an additional menu. The "no" key can be used, for example, to reject a selection or navigate to a previous menu screen. The diagnostic display unit 100 also includes a power key 122 that allows the user to turn the diagnostic display unit 100 on and off. A display adjustment key 120 can also be provided to adjust various features, such as contrast, of the display screen 112 to improve the user's ability to view the contents being displayed. Preferably, the navigation pad 116, the selection keys 118, the display adjustment key 120, and power key disposed on the main support 114 are also constructed from TPE.

According to the construction of the main support 114, a user can advantageously hold and operate the diagnostic display unit 100 using a single hand. This allows the user to utilize their free hand to access various items, or take notes, during the diagnostic process. Additionally, such a one-handed construction allows the user to quickly view and operate the diagnostic display unit 100 while, for example, working under the hood of the vehicle.

Figure 3:
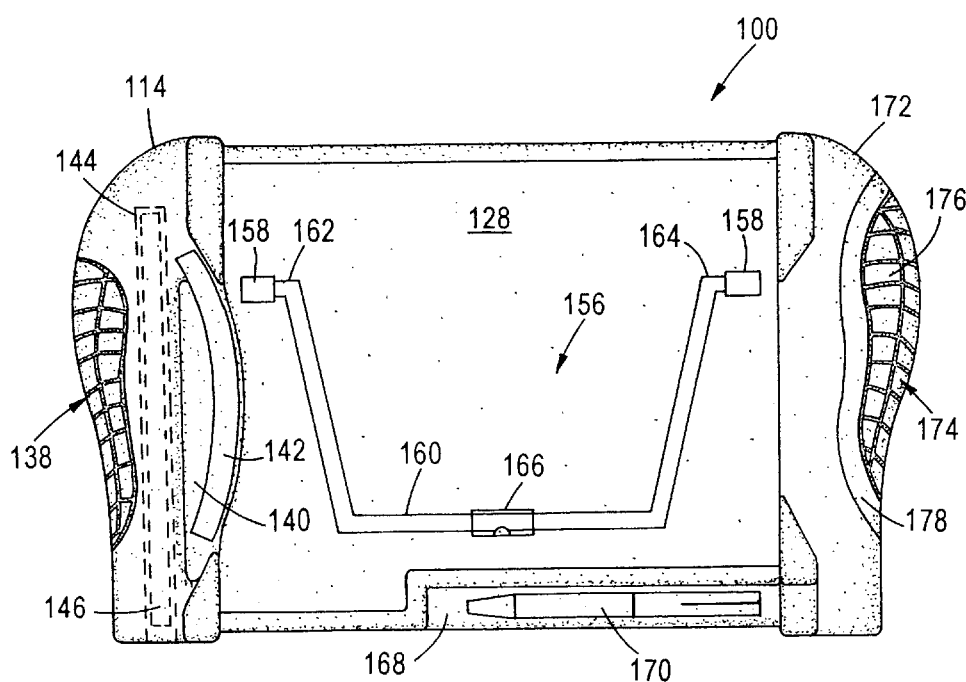
FIG. 3 is a rear view of the vehicle diagnostic display unit.
Figure 4:
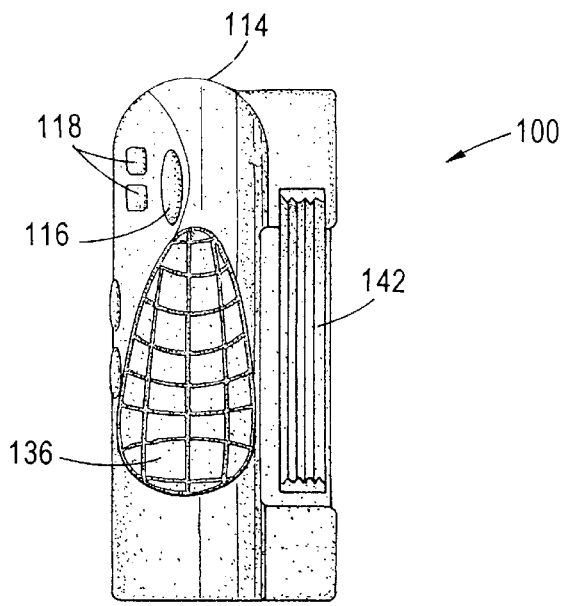
FIG. 4 is a right side view of the vehicle diagnostic display unit.

With continued reference to FIG. 1, and additional reference to FIGS. 3 and 4, the main support 114 also includes a palm rest 138 formed thereon. The main support 114 also includes finger cavity or compartment 140 formed on the rear surface thereof. The finger cavity or compartment 140 extends a prescribed distance into the main support 114 to further improve the user's ability to grip the main support 114. Specifically, when the user grabs the main support 114, the palm rest 138 is designed to comfortably fit into the palm of the user, while the fingers are wrapped around the main support 114 and extended into the finger cavity or compartment 140. Accordingly, a tight and secure grip can be achieved.

A knuckle guard 142 is also formed on the side of the case 110 adjacent to the finger cavity or compartment 140. The knuckle guard 142 is formed from a shock absorbing, or resilient, material such as Ethylene Propylene Diene Monomer (EPDM) having, for example, a Shore hardness of A35 to A45. The knuckle guard 142 is designed to engage the knuckle portion of the user's hand when the diagnostic display unit 100 is being held. Specifically, when the user grasps the main support 114, there will be a tendency for the diagnostic display unit 100 to generate pivot force about the axis of the main support 114. Consequently, the side of the case 110 will come into contact with one of the knuckles of the users hand. Since the case 110 is constructed of a harder material than the knuckle guard 142, certain discomfort will be experienced by the user over extended use.

Specifically, the case 110 will continually press against the knuckle of the user, usually in the form of a point load, and generate a lot of discomfort. By providing a substantially softer material for the knuckle guard 142, the level of discomfort can be significantly reduced. Additionally, the softer material will allow the user's knuckles to press into the knuckle guard 142 so that load will be distributed amongst all the knuckles of the user. Accordingly, not only will the level of discomfort against one knuckle be reduced, but the load is now distributed among multiple knuckles as opposed to one. Such an embodiment allows the user to comfortably operate diagnostic display unit 100 over periods of time.

The combination of the knuckles bearing on the knuckle guard 142 and the fingertips bearing on the inside of the finger cavity 140 allows the user to support the display unit 100 without the need to use the thumb. The combination allows the user the freedom of moving his thumb freely for operation of the thumbpad 116 and/or selection keys 118.

As illustrated in FIGS. 1 and 3, the diagnostic display unit 100 of the present invention can include at least one power supply compartment 144 to allow cordless operation. Depending on the particular design and configuration, the number of power supply compartments 144 can vary so that a sufficient amount of current can be supplied to the display screen 112 and circuitry disposed within the diagnostic display unit 100. Preferably, a single power supply compartment 144 is disposed within the main support 114. One or more power cells 146 are then provided within the power supply compartment 144 to supply power. Such an arrangement advantageously improves the balance of the diagnostic display unit 100 because the weight of the power cell 146 is concentrated in the vicinity of the main support 114 and does not generate a pivot force about the axis of the main support 114. As illustrated in FIG. 1, additional power supply compartments 144 can also be provided. In such embodiments, the additional power supply compartments 144 are positioned as close to the main support 114 as possible in order to reduce the amount of pivot force.

The power cells 146 used in the diagnostic display unit 100 of the present invention can have various configurations depending on the specific application. For example, the power cells 146 can be in the form of various types of batteries capable of supplying the requisite power supply. The batteries can be conventional alkaline batteries or high quality Lithium ion batteries. Preferably, the batteries are rechargeable in order to provide convenient and repeated use. Such rechargeable batteries can be in the form of Nickel Cadmium (NiCd) or Nickel-Metal Hydride (NiMH) batteries. It should be noted however, that any other type of rechargeable battery capable of providing the requisite power output can be used in the present diagnostic display unit 100.

According to one embodiment of the present invention, the power supply compartments 144 are designed to receive, and use, customized power cells 146 such as those sold by Black & Decker under the trade name Versapack. Such an embodiment allows a user to conveniently exchange power cells 146 between numerous tools and devices, including the diagnostic display unit 100.

Figure 5:
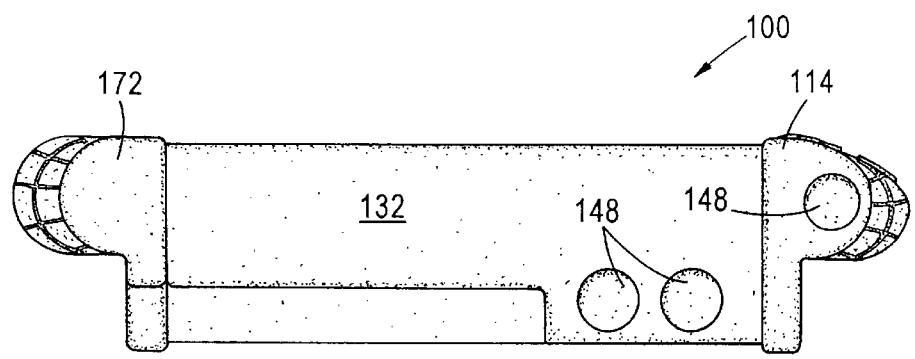
FIG. 5 is a bottom side view of the vehicle diagnostic display unit.

The power supply compartments 144 of the present invention can be configured to securely receive the power cell 146 in various ways. According to one embodiment, a locking cap 148 can be used to close the power supply compartments 144 and retain the power cells 146, as illustrated in FIGS. 1 and 5. The locking cap 148 can be configured to snap into place, or it can be internally threaded for engaging a corresponding threaded element on the case.

Figure 6:
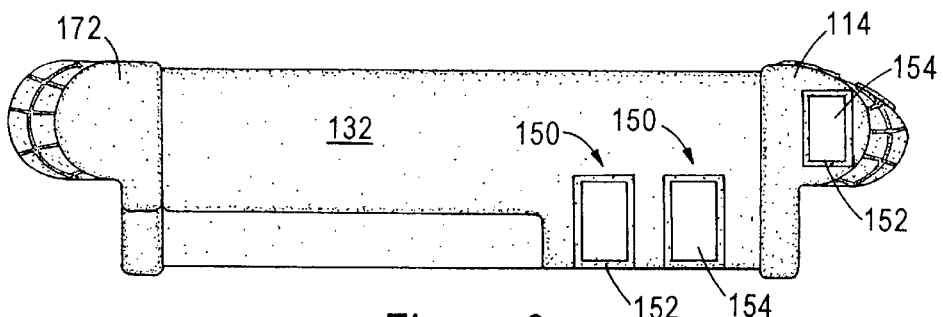
FIG. 6 is a bottom side view of an alternative embodiment of the vehicle diagnostic display unit.

According to an alternative embodiment of the invention illustrated in FIG. 6, a release mechanism 150 is provided for selectively opening and locking the power supply compartment 144. The release mechanism 150 includes a clip recess 152 that is formed on the rear portion of the case 110 and surrounding the power supply compartment 144. A release clip 154 is disposed within the clip recess 152. The release clip 154 is configured such that it is capable of slidably engaging the clip recess 152. For example, the clip recess 152 can be designed such that the sides thereof include channels within which the release clip 154 can travel, or slide. The release clip 154 is also capable of occupying either a closed position or an open position. In the closed position, the release clip 154 is locked in place so that the power cells 146 cannot be removed from the power supply compartment 144. In the open position, the release clip 154 can be completely removed from the channels of the clip recess 152 to allow removal of the power cells 146. Furthermore, the release clip 154 and clip recess 152 also can be designed such that the release clip 154 does not completely detach from the clip recess 152 in the open position.

Turning back to FIG. 3, the diagnostic display unit 100 of the present invention also includes a folding stand 156 that allows the user to set the diagnostic display unit 100 down at a predetermined elevation angle which allows viewing of the display screen 112. The folding stand 156 includes a pair of hinge apertures 158 opposingly disposed on the rear portion of the case 128. Specifically, the hinge apertures 158 are provided along a common axis and separated by a predetermined distance. A leg member 160 is provided for supporting the diagnostic display unit 100. The leg member 160 includes a first end 162 that is inserted into one of the hinge apertures 158, and second end 164 that is inserted in the other hinge aperture 158. The leg member 160 is therefore capable of pivoting within the hinge apertures 158.

A locking clip 166 is provided on the rear portion 128 of the case 110 to securely retain the leg member 160. Accordingly, the locking clip 166 is also positioned in registry with the leg member 160. The locking clip 166 is formed into the rear portion 128 of the case 110 such that it is substantially flush with the surface rear portion 128. As will be appreciated by those skilled in the art, the leg member 160 of the present invention must have sufficient strength for supporting the diagnostic display unit 100, and must therefore be constructed from appropriate materials. According to one embodiment of the invention, the leg member 160 is formed from a metal wire and coated with a layer of vinyl such as Plastisol.

As illustrated in FIG. 3, the diagnostic display unit 100 includes a pen recess 168 formed on the rear portion 128 of the case 110. The pen recess 168 is designed to receive a writing implement 170 such as a pen, pencil, or the like. According to such an arrangement, the user can quickly record information or take notes while performing diagnostic procedures. The pen recess 168 can also function to receive a stylus when the display screen 112 is pressure sensitive. Accordingly, the stylus would be readily available for use by the operator during diagnostic procedures.

Turning again to FIGS. 1 and 2, the diagnostic display unit 100 of the present invention can be optionally provided with an auxiliary support 172. Although unnecessary, the auxiliary support 172 provides the user with the option of supporting the diagnostic display unit 100 with two hands, if desired. As illustrated in FIG. 1, the auxiliary support 172 is positioned on a side of the case 110 that is opposite to the main support 114. The auxiliary support 172 is constructed from similar materials as the main support 114. Additionally, the auxiliary support 172 includes a palm rest 174 that is ergonomically designed to comfortably fit within the palm of the user. A textured portion 176 can also provided on the auxiliary support 172, if desired, to allow the user to form a more secure grip when holding the diagnostic display unit 100.

Since the auxiliary support 172 is not intended to be a required component, its. design differs functionally from that of the main support 114. In particular, the auxiliary support 172 does not include a finger cavity or compartment 140. Rather, a finger recess 178 is provided (see FIG. 3) to allow the user to comfortably support the diagnostic display unit 100. The finger recess 178 is designed such that its depth is shallower than the depth of the finger cavity or compartment 140, since the user's fingers do not need to extend into the finger recess 178 to grasp the auxiliary support 172 for single-handed operation. The auxiliary support 172 can also include a thumb rest portion 180 that allows the user to comfortably set their thumb while supporting the diagnostic display unit 100 with the second hand.

In preferred embodiments of the present invention, the auxiliary support 172 is detachably secured to the side of the case 110. Such an embodiment allows the user to configure the diagnostic display unit 100 with or without the auxiliary support 172. When the auxiliary support 172 is excluded, a side cover 182 (shown in FIG. 9) is provided in its place. The side cover 182 has smaller dimensions that auxiliary support 172 and therefore functions to reduce the overall weight of the diagnostic display unit 100. The side cover 182 is designed such that its dimensions are larger than the dimensions of the side of the case 110 in order to protect the case 110 and display screen 112 from impact. Accordingly, the side cover 182 is also constructed from shock absorbing materials. Removal of either the side cover 182 or the auxiliary support 172 exposes a plurality of expansion slots to be discussed in greater detail below.

Figure 7:
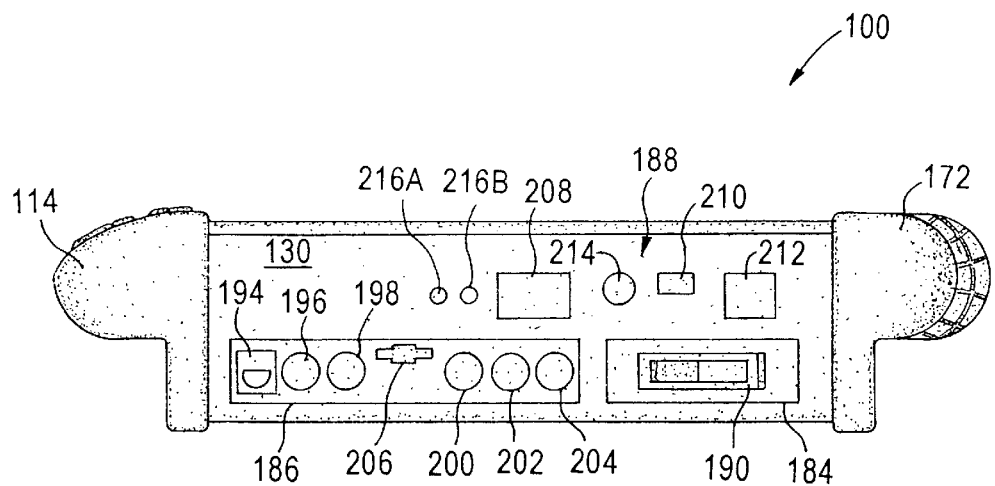
FIG. 7 is a top view of the vehicle diagnostic display unit.
Figure 8:
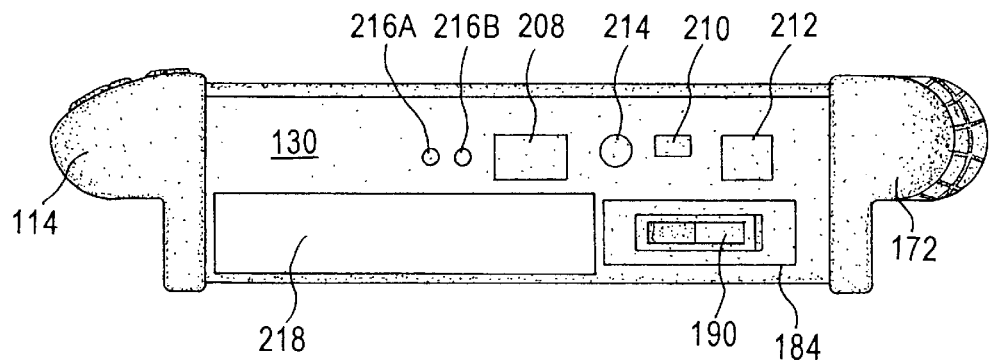
FIG. 8 is a top view of an alternative embodiment of the vehicle diagnostic display unit.

FIG. 7 illustrates the top portion 130 of the case 110 and various components and connectors. Specifically, the top portions 130 includes a primary adapter 184, a secondary adapter 186, and a connection panel 188. The primary adapter 184 includes a primary connector 190, such as a high density d-type connector, disposed therein. The primary connector 190 is intended for receiving a cable (not shown) that is coupled to the vehicle's ECM or on-board computer. Accordingly, the primary connector 190 includes individual wires for receiving and transmitting various signals to and from the on-board computer. The primary adapter 190 is recessed into the top portion 130 in order minimize potential damage that can result from impacts.

According to one embodiment of the present invention, the diagnostic display unit 100 includes a charging circuit 192 disposed within the case 100. The charging circuit 192 functions to supply a charge to the rechargeable power cells 146 when the diagnostic display unit 100 is electrically coupled to the vehicle via the primary connector 190. Accordingly, the primary connector 190 would include the necessary cables or wires to receive power from the vehicle battery. Such an arrangement advantageously allows the user to use the diagnostic display unit 100 over extended periods of time without the risk of losing power during diagnostic procedures.

According to the disclosed embodiment of the invention, the secondary adapter 186 includes a plurality of secondary connectors disposed therein. Similar to the primary connector 190, the secondary connectors are recessed within the secondary adapter 186 in order to minimize potential damage resulting from impact. The secondary connectors are provided for exchanging data and various signals with external components or vehicle components other than the on-board computer. For example, the secondary adapter illustrated in FIG. 7 includes a DIN-9 connector 194, a first input connector 196, a second input connector 198, a first output connector 200, a second output connector 202, and an auxiliary connector 204. The secondary connectors provided on the secondary adapter 186 are capable receiving and exchanging data as well as analog and/or digital signals. The diagnostic display unit 100 can also include a fuse 206, as illustrated in FIG. 7, to prevent damage internal circuitry in the event of a voltage or current overload.

The connection panel 188 also includes a plurality of connectors for exchanging data and signals with external devices. As illustrated in FIG. 7, the connection panel includes a RS-232 port 208, a universal serial bus (USB) port 210, and an Ethernet port 212. All three ports 208–212 are intended for exchanging data and signals. The connection panel 188 also includes a power supply connection 214 for connecting the diagnostic display unit 100 to an external power source. Accordingly, if internal power cells 146 are unavailable or incapable of supplying the requisite power to drive the components, the external power supply 214 can be provided to power the diagnostic display unit 100.

A pair of light emitting diodes (LEDs) 216, is also provided on the top portion 130. The LEDs 216 function as status indicators for the diagnostic display unit 100. For example, according to one embodiment of the present invention, one of the LEDs 216 is configured to indicate when the rechargeable power cells 146 are being recharged. The second LED 216 is configured to indicate the operational status (i.e., on or off) of the diagnostic display unit 100. For example, when the power cells 146 are being recharged, the first LED 216A is on. When the power cells 146 are not being recharged, the first LED 216A is off. Similarly, when the diagnostic display unit 100 is turned on, the second LED 216B is on. When the diagnostic display unit 100 is turned off, the second LED 216B is turned off.

As previously stated, the primary adapter 184 is intended for connection to the vehicle's on-board computer, while the secondary adapter 186 and connection panel 188 allow data and electrical signals to be exchanged with external components and other vehicle components. Accordingly, it is not necessary to provide the secondary adapter 186 and connection panel 188 in order to obtain an operational diagnostic display unit 100. Specifically, embodiments of the present invention can be constructed with only the primary adapter 100 available. If required, the secondary adapter 186 and connection panel 188 can be provided as optional components. If the connection panel 188 is not provided, embodiments of the present invention can also include the power supply connection 214 and LEDs 216 on the top portion 130 of the diagnostic display unit 100. Additionally, an auxiliary cover 218 can be provided on the top portion 130 in order to cover the area where the secondary adapter 186 and connection panel 188 would normally be positioned. Accordingly, the present diagnostic display unit 100 provides flexibility with respect to the additional connectors provided. Such flexibility directly translates to a reduction in cost. Specifically, if a user's diagnostic procedures do not require connection to external components, the diagnostic display unit can be provided without the secondary adapter 186 or the connection panel 188, thereby saving the cost of adding such components to the diagnostic display unit 100.

Figure 9:
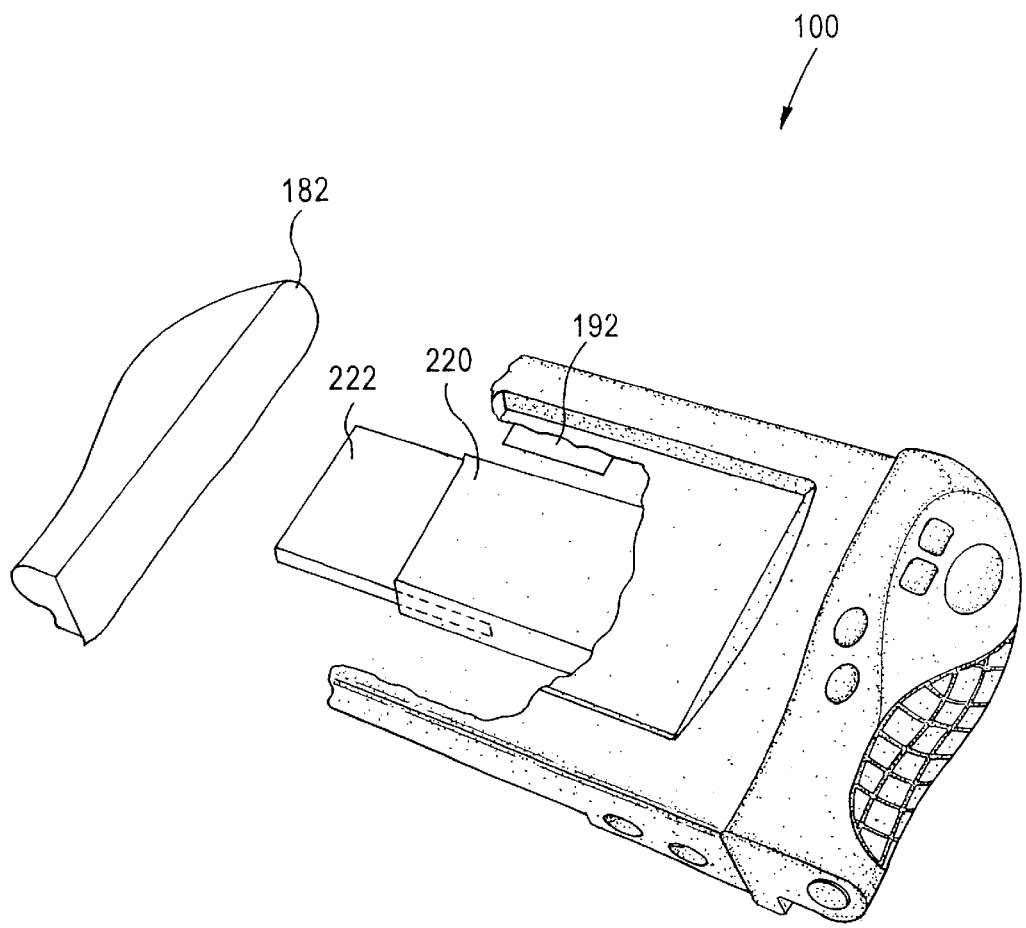
FIG. 9 is a perspective view of the vehicle diagnostic display unit illustrating the expansion slot and an expansion card.

As previously stated, the diagnostic display unit 100 can include at least one expansion slot 220 provided within the case 110. FIG. 9 illustrates such a configuration. Specifically, the expansion slots 220 are provided for upgrading or improving various features of the diagnostic display unit 100. Such features can include, for example, volatile memory, non-volatile memory, a modem interface, etc. These components can be provided based on the configuration of the particular expansion slot 220. Further, if more than one expansion slot 220 is provided, all the expansion slots 220 can be of similar configuration or they can be of different configurations. For example, the expansion slot 220 can be in the form of a PCMCIA slot or a multimedia card (MMC) slot. Accordingly, an expansion card 222 in either of these formats can potentially be configured for use with the diagnostic display unit 100 of the present invention. Such a feature advantageously allows the user to upgrade and improve the features of the diagnostic display unit 100, thereby extending its usable technological life. In other words, rather than replacing the diagnostic display unit 100 for a newer model, the expansion cards 222 cards can be used to upgrade the features of an aging diagnostic display unit 100.

As previously discussed, the diagnostic display unit 100 of the present invention is advantageously designed to allow a user to perform one-handed operations. Specifically, the user is capable of utilizing the navigation pad 116 to position the cursor on various locations on the display screen 112 while also utilizing the selection keys 118 to enter selections, or move forward and backward between various menu screens. Since users can be either left-handed or right-handed, it is possible that certain users will be uncomfortable performing single-handed operation of the diagnostic display unit 100. According to an alternative embodiment of the present invention, rather than providing the main support 114 on the right side of the case 110, the design of the diagnostic display unit 100 is mirrored so that the main support 114 is provided on the left side of the case 110. According to such an embodiment, left handed users can comfortably and precisely operate the diagnostic display unit 100 with one hand.

The diagnostic display unit 100 of the present invention is constructed such that an impact protection arrangement surrounds predetermined portions of the case 110 to prevent damage resulting from various types of impacts. The impact protection arrangement is not in the form of a single component, but rather the result of the cooperation of various components of the diagnostic display unit 100. For example, as illustrated in the Figures, the main support 114 extends past the dimensions of the case 110 in order absorb any impact resulting from a fall. Similarly, the auxiliary support 172 has dimensions that are selected to absorb impact if the diagnostic display unit 100 is dropped. If the auxiliary support 172 is not provided, then the side cover 182 is provided with the requisite dimensions for protecting the diagnostic display unit 100.

Accordingly, it should be appreciated that the components which cooperate to form the impact protection arrangement are constructed from the materials that have sufficient strength and impact resistance to withstand repeated falls from various heights. For example, if the diagnostic display unit 100 is accidentally dropped, the fall will originate from the hand of the user or from a shelf wherein the diagnostic display unit 100 was stored. Typically, such shelves are positioned at a height that is less than 10 feet in order to allow the user to grasp the diagnostic display unit 100. If the fall originates from the hand of the user, the diagnostic display unit 100 will likely travel a distance of less than 5 feet. Accordingly, the materials used to construct the impact protection arrangement are designed to withstand repeated impacts resulting from falls of at least 10 feet.

In the previous descriptions, numerous specific details are set forth, such as specific materials. structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. A vehicle diagnostic display unit comprising:
   a case including a front portion, a rear portion, a top portion, and a bottom portion;
   a display screen disposed within said front portion;
   a main support coupled to a side of said case and containing a finger compartment having a depth sufficient for receiving a user's inserted fingers to allow the user to lift the vehicle diagnostic display unit using the inserted fingers and without using the user's thumb; and
   a plurality of keys disposed on a front surface of said main support;
      said main support being configured to allow a user to simultaneously lift said diagnostic display unit and access said plurality of keys with a single hand;
      wherein the finger compartment is disposed on a rear surface of the main support.

2. The vehicle diagnostic display unit of claim 1, wherein said main support includes a palm rest configured for ergonomic fit within a palm of the user.

3. The vehicle diagnostic display unit of claim 1, wherein said main support includes a textured portion to improve gripping of said main support.

4. The vehicle diagnostic display unit of claim 1, further comprising a knuckle guard positioned on the rear surface of said case and adjacent to said finger compartment.

5. The vehicle diagnostic display unit of claim 4, wherein said knuckle guard is constructed from a resilient material.

6. The vehicle diagnostic display unit of claim 5, wherein said resilient material is Ethylene Propylene Diene Monomer (EPDM).

7. The vehicle diagnostic display unit of claim 1, further comprising at least one expansion slot disposed within said case.

8. The vehicle diagnostic display unit of claim 7, wherein said expansion slot is a PCMCIA slot.

9. The vehicle diagnostic display unit of claim 7, wherein said expansion slot is configured for receiving a MultiMedia Card (MMC).

10. The vehicle diagnostic display unit of claim 1, further comprising an auxiliary support positioned on a side of said case that is opposite said main support.

11. The vehicle diagnostic display unit of claim 10, wherein said auxiliary support includes a palm rest.

12. The vehicle diagnostic display unit of claim 10, wherein said auxiliary support includes a thumb rest.

13. The vehicle diagnostic display unit of claim 10, wherein said auxiliary support includes a textured portion.

14. The vehicle diagnostic display unit of claim 10, wherein said auxiliary support includes a finger recess.

15. The vehicle diagnostic display unit of claim 1, wherein said plurality of keys includes a navigation pad.

16. The vehicle diagnostic display unit of claim 15, wherein said navigation pad is a directional thumb pad.

17. The vehicle diagnostic display unit of claim 15, wherein said navigation pad is pressure sensitive.

18. The vehicle diagnostic display unit of claim 1, wherein said plurality of keys includes at least one selection key.

19. The vehicle diagnostic display unit of claim 1, wherein said plurality of keys includes a display adjustment key.

20. The vehicle diagnostic display unit of claim 1, wherein said plurality of keys includes power key.

21. The vehicle diagnostic display unit of claim 1, wherein said display screen is a Liquid Crystal Display (LCD) screen.

22. The vehicle diagnostic display unit of claim 21, further comprising a layer of Lexan disposed in front of said LCD screen.

23. The vehicle diagnostic display unit of claim 21, wherein said display screen is a color display screen.

24. The vehicle diagnostic display unit of claim 21, wherein said display screen is a monochrome display screen.

25. The vehicle diagnostic display unit of claim 21, wherein said display screen is a gray-scale display screen.

26. The vehicle diagnostic display unit of claim 1, further comprising:
   a primary adapter located on the top portion of said case; and
   a connector disposed within said primary adapter.

27. The vehicle diagnostic display unit of claim 26, wherein said connector is a high-density D-type connector.

28. The vehicle diagnostic display unit of claim 26, further comprising an auxiliary cover coupled to a part of said top member proximate said primary adapter.

29. The vehicle diagnostic display unit of claim 1, further comprising:
   a secondary adapter located on the top portion of said case and proximate said primary adapter; and
   a plurality of secondary connectors disposed within said secondary adapter.

30. The vehicle diagnostic display unit of claim 1, further comprising a connection panel located on the top portion of said case.

31. The vehicle diagnostic display unit of claim 30, wherein said connection panel includes a plurality of ports and a power supply connection.

32. The vehicle diagnostic display unit of claim 31, wherein said plurality of ports includes an RS-232 port.

33. The vehicle diagnostic display unit of claim 31, wherein said plurality of ports includes a Universal Serial Bus (USB) port.

34. The vehicle diagnostic display unit of claim 31, wherein said plurality of ports includes an Ethernet port.

35. The vehicle diagnostic display unit of claim 31, wherein said connection panel further comprises at least one light emitting diode (LED).

36. The vehicle diagnostic display unit of claim 1, further comprising;
at least one power supply compartment formed in the bottom portion of said case; and
one or more power cells removably disposed within each power supply compartment.

37. The vehicle diagnostic display unit of claim 36, further comprising a release mechanism coupled to each power supply compartment.

38. The vehicle diagnostic display unit of claim 37, wherein said release mechanism includes:
a clip recess formed on a surface of the rear portion of said case surrounding each power supply compartment; and
a release clip slidably disposed within said clip recess, said release clip being capable of occupying a closed position and an open position.

39. The vehicle diagnostic display unit of claim 36, wherein each power cell comprises a rechargeable battery.

40. The vehicle diagnostic display unit of claim 39, further comprising a charging circuit for supplying a charge to said rechargeable battery when said vehicle diagnostic display unit of claim 39 is electrically coupled to a vehicle.

41. The vehicle diagnostic display unit of claim 39, wherein said rechargeable battery is a Nickel-Cadmium (NiCd) battery.

42. The vehicle diagnostic display unit of claim 39, wherein said rechargeable battery is a Nickel-Metal-Hydride (Ni-MH) battery.

43. The vehicle diagnostic display unit of claim 36, wherein said power cell comprises a non-rechargeable battery.

44. The vehicle diagnostic display unit of claim 36, wherein said one or more power cells include is a Lithium ion battery.

45. The vehicle diagnostic display unit of claim 36, wherein said at least one power supply compartment comprises a plurality of power supply compartments.

46. The vehicle diagnostic display unit of claim 1, further comprising a folding stand secured to the rear portion of said case.

47. The vehicle diagnostic display unit of claim 46, wherein said folding stand comprises:
a pair of hinge apertures opposingly disposed on the rear surface of said case;
a leg member having first and second ends correspondingly disposed within said pair of hinge apertures, said leg member being pivotable within said pair hinge apertures; and
a locking clip disposed on the rear portion of said case for locking said leg member, said locking clip being substantially flush with the rear.

48. The vehicle diagnostic display unit of claim 1, wherein said display screen is shock mounted within the front portion of said case.

49. The vehicle diagnostic display unit of claim 1, further comprising an impact protection arrangement surrounding predetermined portions of said case to prevent damage to said vehicle diagnostic display unit.

50. The vehicle diagnostic display unit of claim 1, further comprising:
a pen recess formed on the rear portion of said case; and
a writing implement disposed within said pen recess.

51. The vehicle diagnostic display unit of claim 1, wherein said main support is coupled to a side of said case which facilitates left-handed operation.

52. The vehicle diagnostic display unit of claim 1, wherein said main support is coupled to a side of said case which facilitates right-handed operation.

53. A vehicle diagnostic display unit comprising:
a case including a front portion, a rear portion, a top portion, and a bottom portion;
an LCD display screen disposed within said front portion;
a main support coupled to a side of said case, said main support including:
a finger compartment in a rear surface thereof having a depth sufficient for receiving a user's inserted fingers to allow the user to lift the vehicle diagnostic display unit using the inserted fingers and without using the user's thumb,
a palm rest configured for ergonomic fit within a palm of the user,
a textured portion to improve gripping of said main support, and
a knuckle guard positioned on the rear surface of said case and adjacent to said finger compartment;
at least one expansion slot disposed within said case;
a plurality of keys disposed on a front surface of said main support;
an auxiliary support positioned on a side of said case that is opposite said main support, said auxiliary support including a thumb rest and a palm rest;
a primary adapter located on the top portion of said case; and
a connector disposed within said primary adapter;
said main support being configured to allow a user to simultaneously lift said diagnostic display unit and access said plurality of keys with a single hand.

54. The vehicle diagnostic display unit of claim 53, wherein: said plurality of keys includes at least one selection key and a pressure sensitive directional thumb pad.

55. The vehicle diagnostic display unit of claim 53, further comprising a layer of Lexan disposed in front of said LCD screen.

56. The vehicle diagnostic display unit of claim 53, further comprising:
a secondary adapter located on the top portion of said case and proximate said primary adapter; and
a plurality of secondary connectors disposed within said secondary adapter.

57. The vehicle diagnostic display unit of claim 53, further comprising a connection panel located on the top portion of said case, said connection panel including:
a plurality of ports and a power supply connection; at least one port selected from the group of ports consisting of an RS-232 port, a USB port, and an Ethernet port; and at least one LED.

58. The vehicle diagnostic display unit of claim 1, further comprising;
at least one power supply compartment formed in the bottom portion of said case; and
one or more power cells removably disposed within each power supply compartment.

59. An automotive diagnosis device comprising:
a case for housing a data processor and a data storage device coupled to the data processor, wherein the case has a front portion, a rear portion, a top portion, and a bottom portion;

a display screen disposed on the front portion of the case;

a main support formed on a side of the case, wherein the main support is configured to allow a user to simultaneously lift the automotive diagnosis device and access a plurality of keys disposed on the main support with a single hand;

a finger compartment having a depth sufficient for receiving a user's inserted fingers formed near the side of the case on which the main support is formed; and a connector disposed on the top portion of the case for receiving a cable to establish signal communications with an on-vehicle data processing unit.

* * * * *